(12) United States Patent
Ho

(10) Patent No.: US 9,328,864 B1
(45) Date of Patent: May 3, 2016

(54) CARRIER DEVICE FOR DISPLAY DEVICE

(71) Applicant: Oxti Corporation, Taipei (TW)

(72) Inventor: Chih Feng Ho, Taipei (TW)

(73) Assignee: Oxti Corporation, Chungho, Taipei (TW)

( * ) Notice: Subject to any disclaimer, the term of this patent is extended or adjusted under 35 U.S.C. 154(b) by 0 days.

(21) Appl. No.: 14/509,204

(22) Filed: Oct. 8, 2014

(51) Int. Cl.
*A47F 5/00* (2006.01)
*F16M 13/02* (2006.01)
*G06F 1/16* (2006.01)
*H05K 5/02* (2006.01)

(52) U.S. Cl.
CPC .............. *F16M 13/022* (2013.01); *G06F 1/16* (2013.01); *H05K 5/0226* (2013.01)

(58) Field of Classification Search
USPC ............ 248/917, 919, 921, 922, 923, 288.31, 248/291.1, 292.14, 371, 393, 276.1, 282.1, 248/289.11
See application file for complete search history.

(56) References Cited

U.S. PATENT DOCUMENTS

| 6,478,275 | B1 | 11/2002 | Huang | |
|---|---|---|---|---|
| 6,769,657 | B1 | 8/2004 | Huang | |
| 6,822,857 | B2 | 11/2004 | Jung et al. | |
| 6,863,252 | B2 | 3/2005 | Bosson | |
| 7,413,152 | B1 | 8/2008 | Chen | |
| 7,448,584 | B2 * | 11/2008 | Chen | F16M 11/10 248/122.1 |
| 7,861,998 | B2 * | 1/2011 | Huang | F16M 11/04 248/125.1 |
| 8,220,767 | B2 * | 7/2012 | Lin | F16M 11/10 248/127 |
| 2002/0011544 | A1 * | 1/2002 | Bosson | F16M 11/04 248/121 |
| 2004/0262474 | A1 * | 12/2004 | Boks | F16M 11/04 248/276.1 |
| 2005/0127261 | A1 * | 6/2005 | Lin | F16C 11/06 248/288.51 |

* cited by examiner

*Primary Examiner* — Steven Marsh
(74) *Attorney, Agent, or Firm* — Charles E. Baxley

(57) ABSTRACT

A carrier device includes an attachment having a base member, a unidirectional bearing member engaged in the base member, a mounting seat having a coupler, and a shaft device attached to the coupler and engaged with the unidirectional bearing member for rotatably attaching the coupler and the mounting seat to the base member of the attachment, and the unidirectional bearing member is arranged to allow the shaft device and the coupler and the mounting seat to be rotated only upwardly relative to the base member. The coupler includes a space for forming two ears and for receiving the base member. The ears each include a recess communicating with the space of the coupler for engaging with the shaft device.

6 Claims, 4 Drawing Sheets

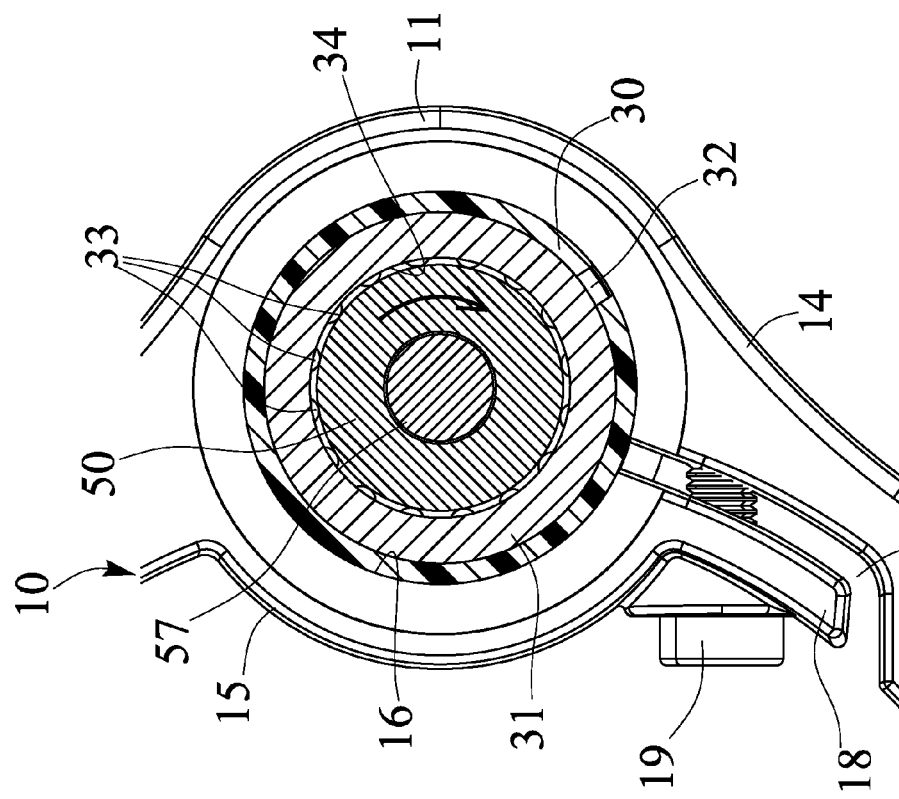
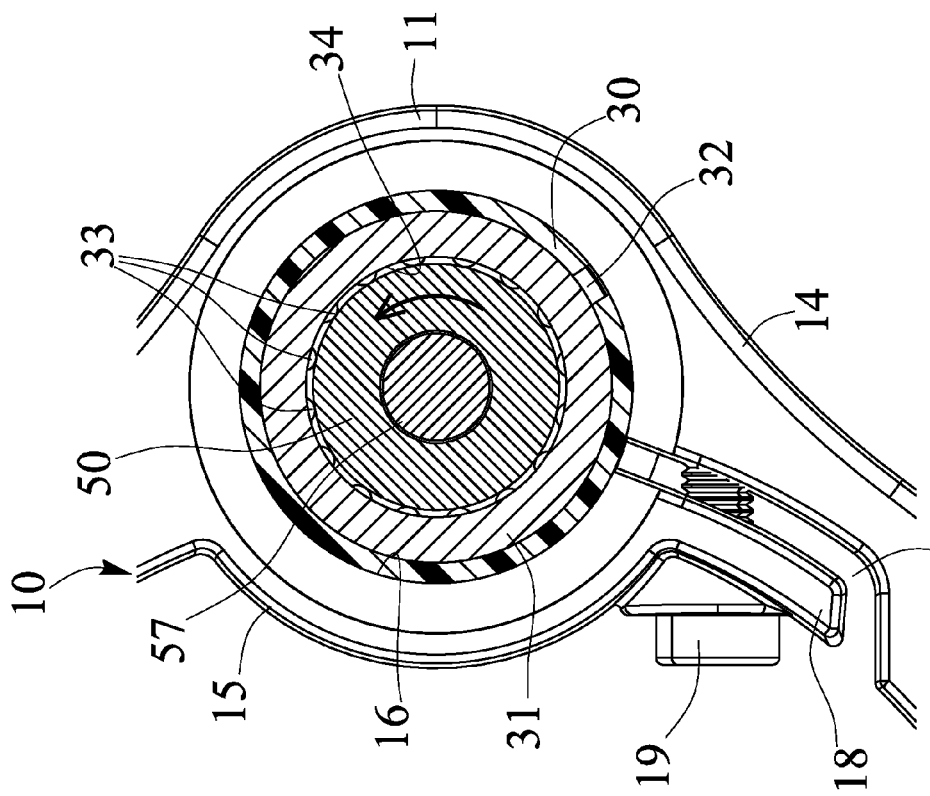

CARRIER DEVICE FOR DISPLAY DEVICE

BACKGROUND OF THE INVENTION

1. Field of the Invention

The present invention relates to a carrier device for supporting various articles or objects, such as monitors, keyboards, displayers, antenna members or the like, and more particularly to a carrier device including an improved structure for stably supporting various articles or objects or the like at the selected or suitable positions and for allowing the user to easily view or operate the supported objects or monitors or keyboards or antenna members or displayers or the like.

2. Description of the Prior Art

Typical carrier devices for supporting such as monitors or antenna members or displayers or keyboards comprise a mounting seat for attaching or coupling to the monitors or the antenna members or the displayers or the keyboards, and a movable seat and an engaging plate pivotally coupling the mounting seat to a carrier plate for pivotally coupling and supporting the monitors or the antenna members or the displayers or the keyboards to the carrier plate and for adjustably supporting the monitors or the antenna members or the displayers or the keyboards at the selected or suitable or predetermined angular positions relative to the carrier plate.

For example, U.S. Pat. No. 6,478,275 to Huang, U.S. Pat. No. 6,769,657 to Huang, U.S. Pat. No. 6,822,857 to Jung et al., U.S. Pat. No. 6,863,252 to Bosson, and U.S. Pat. No. 7,413,152 to Chen disclose several of the typical carrier devices each comprising a movable seat and an engaging plate disposed parallel to each other and pivotally coupled between a carrier plate and a mounting seat, in which the mounting seat may be used for supporting the monitors or antenna members or keyboards, and thus for allowing the monitors or antenna members or keyboards and the carrier plate to be adjustably attached to and supported at the selected or suitable or predetermined angular position relative to the carrier plate.

However, the carrier plate and the articles or objects supported on the carrier plate may not be easily adjusted to different angular positions relative to the mounting seat and may not be easily seen or viewed by the user.

The present invention has arisen to mitigate and/or obviate the afore-described disadvantages of the conventional carrier devices for supporting the monitors or the displayers or the keyboards or the like.

SUMMARY OF THE INVENTION

The primary objective of the present invention is to provide a carrier device including an improved structure for stably supporting various articles or objects or the like at the selected or suitable positions and for allowing the user to easily view or operate the supported objects or monitors or keyboards or antenna members or displayers or the like.

In accordance with one aspect of the invention, there is provided a carrier device comprising an attachment including a base member having a chamber formed therein, a unidirectional bearing member engaged in the chamber of the base member of the attachment, a mounting seat including a coupler attached to the mounting seat, and a shaft device attached to the coupler and engaged with the unidirectional bearing member for rotatably attaching the coupler and the mounting seat to the base member of the attachment, and the unidirectional bearing member is arranged to allow the shaft device and the coupler and the mounting seat to be rotated only upwardly relative to the base member and for preventing the shaft device and the coupler and the mounting seat from being pivoted or rotated downwardly relative to the base member when the unidirectional bearing member is solidly secured to the base member.

The coupler includes a space formed therein for defining two ears and for receiving the base member and for receiving or engaging with the middle portion of the base member. The ears each include a recess formed therein and communicating with the space of the coupler for engaging with the shaft device. The recesses of the ears each include a frustum shape.

The shaft device includes two gaskets engaged into the recesses of the coupler, and engaged between the shaft device and the ears respectively. The shaft device includes two shaft segments engaged into the recesses and the space of the coupler and engaged with the unidirectional bearing member for limiting the rotational direction of the shaft segments of the shaft device relative to the base member.

The gaskets each include a frustum shape, and the shaft segments each include a frustum-shaped head for engaging with the frustum-shaped gaskets respectively and for solidly and stably anchoring and retaining the shaft segments of the shaft device to the ears of the coupler, and may prevent the shaft device from being disengaged or separated from the ears of the coupler. The shaft device includes a fastener engaged through the shaft segments for securing the shaft segments of the shaft device to the ears of the coupler.

The base member includes a cylindrical member formed in the middle portion of the base member and engaged in the space of the coupler, and the chamber is formed in the cylindrical member. The base member includes a barrel engaged into the chamber of the cylindrical member and engaged between the cylindrical member and the unidirectional bearing member for frictionally contacting and engaging with the cylindrical member and the unidirectional bearing member.

The base member includes a slot formed in the middle portion of the base member and communicating with the chamber of the cylindrical member for forming a flap on the cylindrical member and for allowing the flap to be moved and adjusted relative to the middle portion of the base member and for adjusting a width of the slot of the base member and for adjusting an inner diameter of the chamber of the cylindrical member and for allowing the unidirectional bearing member to be solidly secured to the cylindrical member of the base member.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a partial exploded view of a carrier device in accordance with the present invention for supporting a monitor or displayer or antenna member or keyboard or article or the like;

FIG. 4 is a partial cross sectional view of the carrier device, taken along lines 4-4 of FIG. 2;

FIG. 5 is another partial cross sectional view similar to FIG. 4, illustrating the operation of the carrier device;

DETAILED DESCRIPTION OF THE PREFERRED EMBODIMENT

Figure 1:
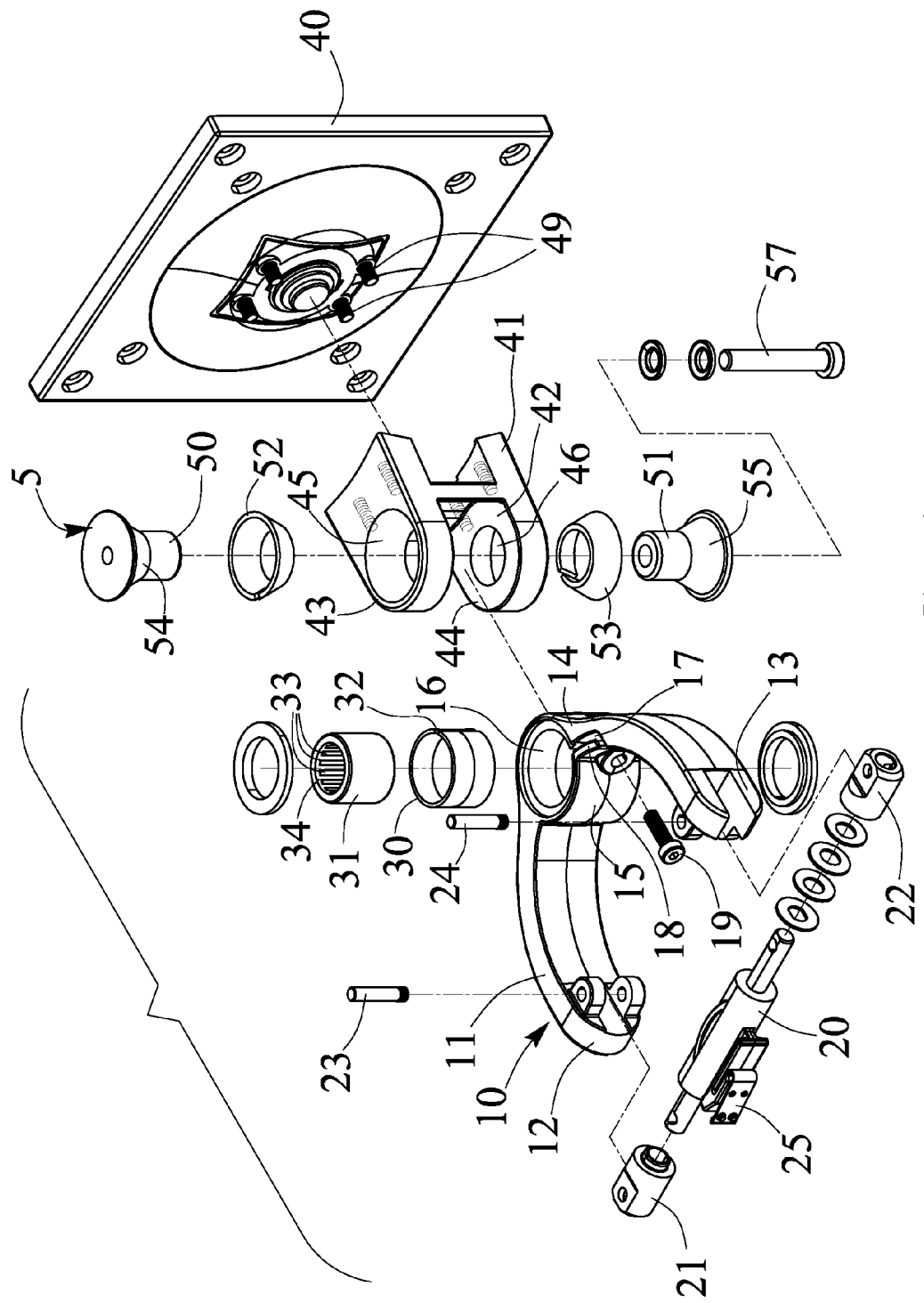
Figure 2:
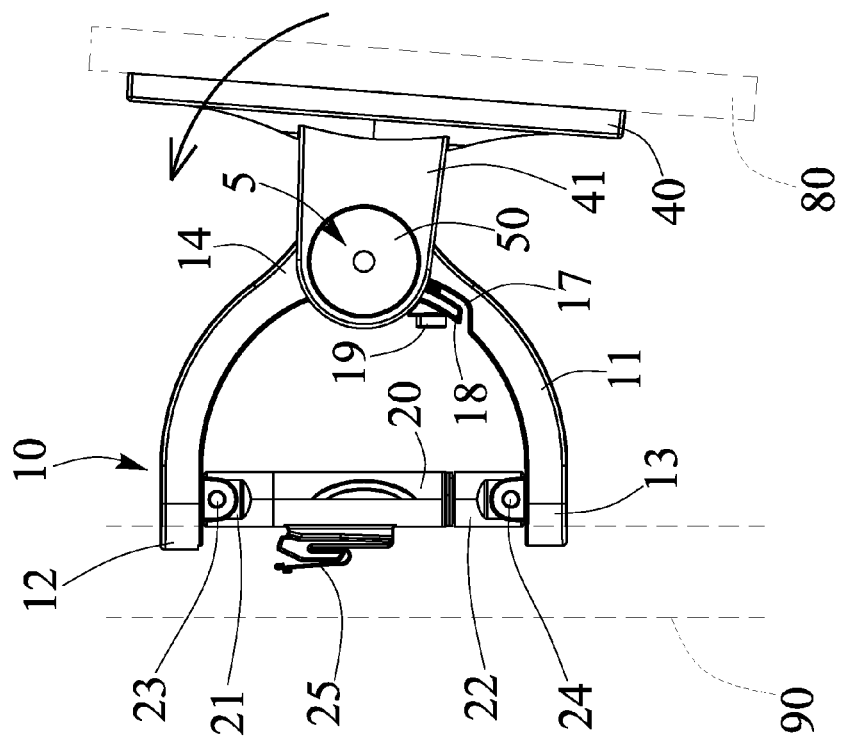
FIG. 2 is a perspective view of the carrier device.
Figure 3:
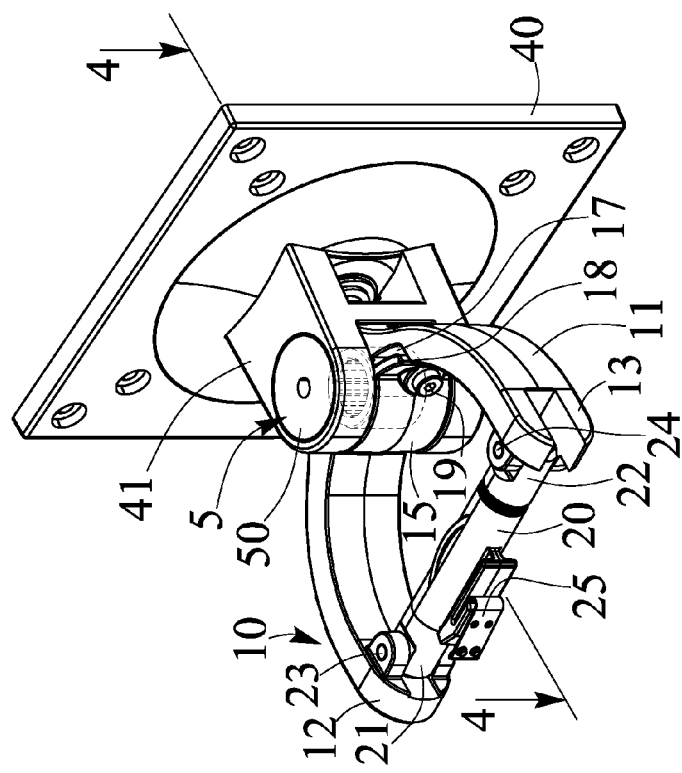
FIG. 3 is a side plan schematic view illustrating the operation of the carrier device.

Referring to the drawings, and initially to FIGS. 1-3, a carrier device in accordance with the present invention is provided for supporting an article or object 80, such as an antenna member, article, portable or mobile phone, keyboard, displayer, monitor 80, or the like, and for supporting the object 80 at the selected or suitable or predetermined position relative to the supporting wall or member 90 or the like, and comprises a supporting base or attachment 10 for being disposed or attached or mounted or secured or supported on the supporting member 90. For example, the supporting base or attachment 10 includes an arched or expanded or V or C-shaped bracket or base member 11 having an upper portion 12, a bottom portion 13, or two end portions 12, 13 and a middle or intermediate portion 14.

A shaft or beam 20 includes two end members or studs 21, 22 each attached or mounted or secured to the end portions and pivotally or rotatably attached or mounted or secured to the two end portions 12, 13 of the bracket or base member 11 with a pivot pin 23, 24 or the like, and includes a hook or anchor device or latch 25 formed or provided thereon for coupling or attaching or supporting or securing or engaging with the supporting member 90 and for detachably or removably attaching or mounting or securing or coupling the beam 20 and the base member 11 to the supporting member 90. The engagement or attachment of the beam 20 and the base member 11 to the supporting member 90 is not related to the present invention and will not be described in further details.

Figure 7:
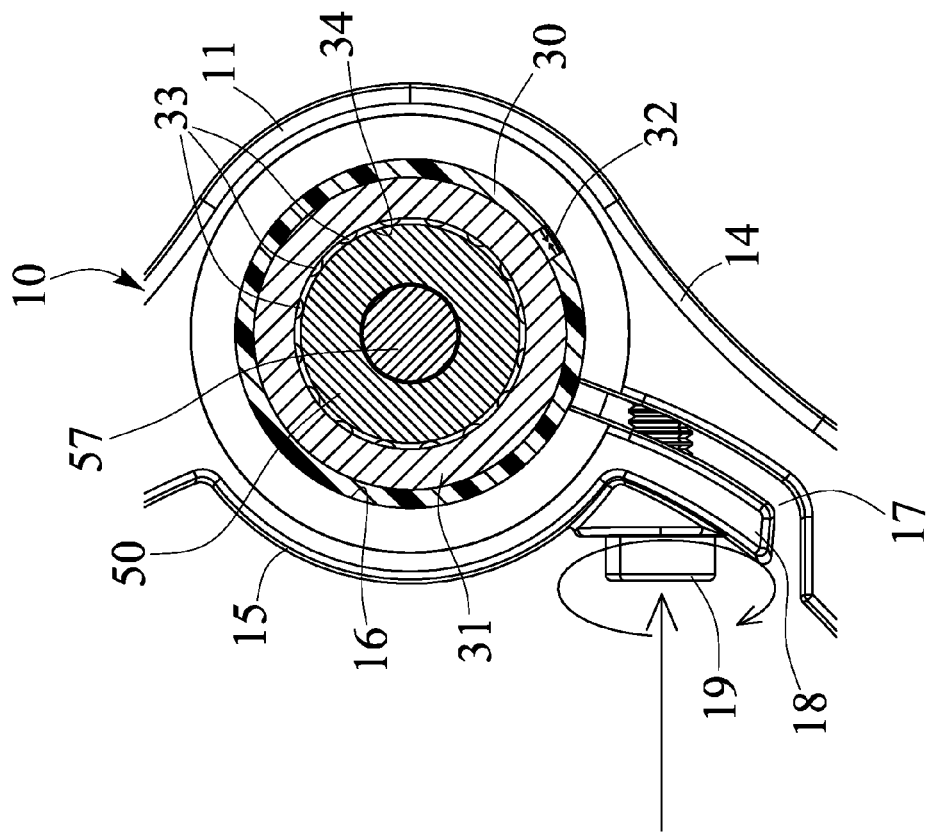
FIG. 7 is a further partial cross sectional view similar to FIGS. 4 and 5, illustrating the operation of the carrier device.

The attachment 10 includes a cylindrical member 15 formed or provided on the middle or intermediate portion 14 thereof, and includes a cylindrical bore or chamber 16 formed or provided in the cylindrical member 15, and includes a slit or gap or slot 17 formed in the middle portion 14 of the base member 11 and communicating with the chamber 16 of the cylindrical member 15 of the base member 11 for forming or defining an ear or flap 18 on the cylindrical member 15 (FIGS. 3-7), and for allowing the flap 18 to be moved or adjusted relative to the middle portion 14 of the base member 11 for adjusting the dimension or width of the slot 17 of the base member 11 and also for adjusting the dimension or inner diameter of the chamber 16 of the cylindrical member 15 (FIGS. 4-5 and 7).

A gasket or barrel 30 and a unidirectional bearing member 31 are disposed or engaged into the chamber 16 of the cylindrical member 15, in which the barrel 30 is disposed or positioned or located or engaged between the cylindrical member 15 and the unidirectional bearing member 31, and the barrel 30 includes a slot or groove 32 formed therein for allowing the barrel 30 to be narrowed or expanded to different diameters (FIGS. 4, 5, 7), and the unidirectional bearing member 31 includes a number of balls or rollers 33 partially extended into a bore or compartment 34 thereof, a lock or fastener 19 is engageable with the flap 18 and engageable through the slot 17 of the base member 11 and also engageable with the middle portion 14 of the base member 11 for adjusting the dimension or width of the slot 17 of the base member 11 and for detachably or removably attaching or mounting or securing the barrel 30 and the unidirectional bearing member 31 to the cylindrical member 15 of the base member 11.

A mounting seat 40 is to be rotatably or pivotally coupled to and supported on the base member 11 of the attachment 10 with a frame or bracket or coupler 41 for attaching or mounting or securing or supporting the object 80 (FIGS. 3, 6), the coupler 41 is attached or mounted or secured to the mounting seat 40 with one or more catches or latches or locks or fasteners 49 (FIG. 1), and includes a gap or notch or space 42 formed therein for forming or defining two arms or flaps or ears 43, 44, and the ears 43, 44 each include an orifice or recess 45, 46, such as a frustum-shaped recess 45, 46 formed therein and communicating with the space 42 of the coupler 41 for pivotally or rotatably attaching or mounting or securing or supporting or engaging with a shaft device 5. The space 42 which is formed or provided between the ears 43, 44 is provided for receiving or engaging with the cylindrical member 15 at the middle portion 14 of the base member 11.

The shaft device 5 includes one or more (such as two) shaft studs or elements or segments 50, 51 engaged into the recesses 45, 46 and the space 42 of the coupler 41, and engaged with the unidirectional bearing member 31 for pivotally or rotatably attaching or mounting or securing the coupler 41 and the mounting seat 40 to the base member 11 of the attachment 10, the shaft device 5 includes one or more (such as two) washers or gaskets 52, 53, such as frustum-shaped gaskets 52, 53 also engaged into the recesses 45, 46 of the coupler 41, and engaged with or between the shaft segments 50, 51 and the ears 43, 44 for solidly and stably anchoring or retaining or positioning the shaft segments 50, 51 of the shaft device 5 to the ears 43, 44 of the coupler 41. It is preferable that the shaft segments 50, 51 each include a frustum-shaped portion or head 54, 55 formed or provided thereon for snugly contacting or engaging with the gaskets 52, 53 respectively.

The engagement or attachment of the frustum-shaped heads 54, 55 of the shaft segments 50, 51 with the frustum-shaped gaskets 52, 53 or the frustum-shaped recesses 45, 46 of the coupler 41 may solidly and stably anchor or retain or position the shaft segments 50, 51 of the shaft device 5 to the ears 43, 44 of the coupler 41 and may prevent the shaft device 5 from being disengaged or separated from the ears 43, 44 of the coupler 41. The shaft device 5 may further include a latch or catch or fastener 57 engaged through the shaft segments 50, 51 for solidly and stably securing or coupling the shaft segments 50, 51 of the shaft device 5 to the ears 43, 44 of the coupler 41, and thus for solidly and stably anchoring or retaining or positioning the shaft segments 50, 51 of the shaft device 5 in the unidirectional bearing member 31.

In operation, as shown in FIG. 7, the fastener 19 is engageable with the flap 18 and engageable through the slot 17 of the base member 11 and also engageable with the middle portion 14 of the base member 11 for moving or forcing the flap 18 toward the middle portion 14 of the base member 11 and for decreasing or adjusting the dimension or width of the slot 17 of the base member 11 and for detachably or removably attaching or mounting or securing the barrel 30 and the unidirectional bearing member 31 to the cylindrical member 15 of the base member 11. When the barrel 30 and the unidirectional bearing member 31 are solidly and stably secured to the cylindrical member 15 of the base member 11, the shaft segments 50, 51 of the shaft device 5 is arranged to be pivoted or rotated only upwardly or counterclockwise relative to the cylindrical member 15 of the base member 11 with the unidirectional bearing member 31 (FIGS. 3, 4); i.e., the unidirectional bearing member 31 is arranged to allow the shaft segments 50, 51 of the shaft device 5 and the coupler 41 and the mounting seat 40 to be pivoted or rotated only upwardly or counterclockwise relative to the cylindrical member 15 of the base member 11.

Figure 6:
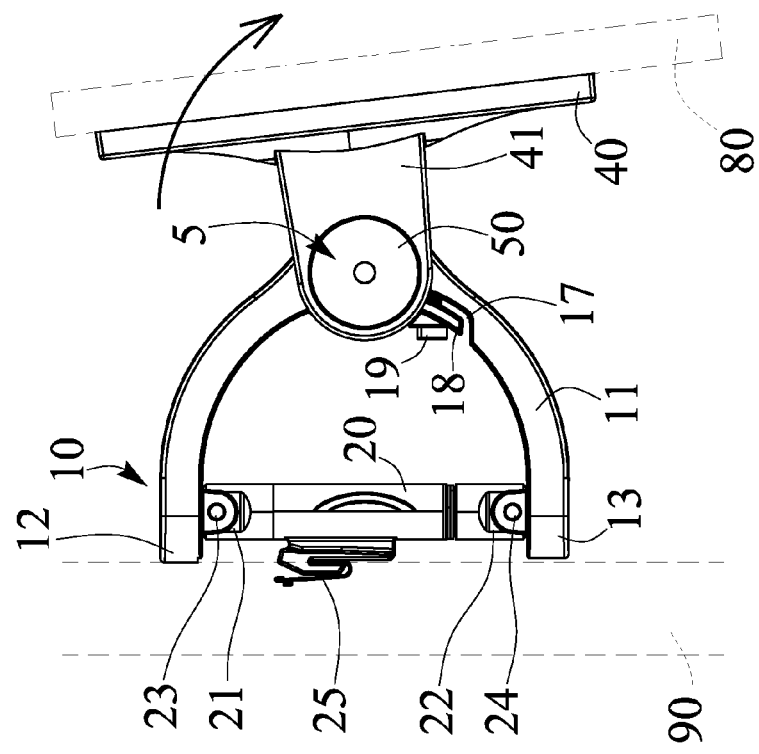
FIG. 6 is a partial side plan schematic view similar to FIG. 3, illustrating the operation of the carrier device.

As shown in FIGS. 5 and 6, the shaft segments 50, 51 of the shaft device 5 and the coupler 41 and the mounting seat 40 may be allowed to be pivoted or rotated downwardly or clockwise relative to the cylindrical member 15 of the base member 11 when the flap 18 and the barrel 30 and the unidirectional bearing member 31 are loosened by the fastener 19. It is to be noted that the shaft segments 50, 51 of the shaft device 5 and the coupler 41 and the mounting seat 40 may be easily and quickly pivoted or rotated upwardly or counterclockwise relative to the cylindrical member 15 of the base member 11, and the unidirectional bearing member 31 may prevent the shaft segments 50, 51 of the shaft device 5 and the coupler 41 and the mounting seat 40 from being pivoted or rotated downwardly or clockwise relative to the cylindrical member 15 of the base member 11 when the flap 18 and the barrel 30 and the unidirectional bearing member 31 are solidly and stably secured to the cylindrical member 15 of the base member 11.

Accordingly, the carrier device includes an improved structure for stably supporting various articles or objects or the like at the selected or suitable positions and for allowing the user to easily view or operate the supported objects or monitors or keyboards or antenna members or displayers or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A carrier device comprising:
   an attachment including a base member having a chamber formed therein,
   a unidirectional bearing member engaged in said chamber of said base member of said attachment,
   a mounting seat including a coupler attached to said mounting seat, and said coupler including a space formed therein for defining two ears and for receiving said base member, said ears each including a recess formed therein and communicating with said space of said coupler,
   a shaft device attached to said coupler and engaged with said recesses of said ears and engaged with said unidirectional bearing member for rotatably attaching said coupler and said mounting seat to said base member of said attachment, and said unidirectional bearing member being arranged to allow said shaft device and said coupler and said mounting seat to be rotated only upwardly relative to said base member, said shaft device including two gaskets engaged into said recesses of said coupler, and engaged between said shaft device and said ears respectively, said gaskets each including a frustum shape, said shaft device including two shaft segments engaged into said recesses and said space of said coupler and engaged with said unidirectional bearing member, and said shaft segments each including a frustum-shaped head for engaging with said gaskets respectively.

2. The carrier device as claimed in claim 1, wherein said recesses of said ears each include a frustum shape.

3. The carrier device as claimed in claim 1, wherein said shaft device includes a fastener engaged through said shaft segments for securing said shaft segments of said shaft device to said ears of said coupler.

4. The carrier device as claimed in claim 1, wherein said base member includes a cylindrical member formed in said middle portion of said base member and engaged in said space of said coupler, and said chamber is formed in said cylindrical member.

5. The carrier device as claimed in claim 4, wherein said base member includes a barrel engaged into said chamber of said cylindrical member and engaged between said cylindrical member and said unidirectional bearing member.

6. A carrier device comprising:
   an attachment including a base member having a chamber formed therein,
   a unidirectional bearing member engaged in said chamber of said base member of said attachment,
   a mounting seat including a coupler attached to said mounting seat, and said coupler including a space formed therein for defining two ears and for receiving said base member, said base member including a cylindrical member formed in said middle portion of said base member and engaged in said space of said coupler, and said chamber being formed in said cylindrical member,
   a shaft device attached to said coupler and engaged with said unidirectional bearing member for rotatably attaching said coupler and said mounting seat to said base member of said attachment, and said unidirectional bearing member being arranged to allow said shaft device and said coupler and said mounting seat to be rotated only upwardly relative to said base member, wherein
   said base member includes a slot formed in said middle portion of said base member and communicating with said chamber of said cylindrical member for forming a flap on said cylindrical member and for allowing said flap to be moved and adjusted relative to said middle portion of said base member and for adjusting a width of said slot of said base member and for adjusting an inner diameter of said chamber of said cylindrical member.

* * * * *